US 8,577,905 B2

(12) United States Patent
Gan et al.

(10) Patent No.: US 8,577,905 B2
(45) Date of Patent: Nov. 5, 2013

(54) SYSTEM, METHOD, AND LOGIC FOR OPTIMIZED GEOSPATIAL DATA DELIVERY

(75) Inventors: Zhen-Qi Gan, Carrollton, TX (US); Nicholas Sun, Cerritos, CA (US); David A. Denslow, Dallas, TX (US); Daryl J. Douglas, Rockwall, TX (US); Kyle S. Miller, Venice, CA (US); Richard Pingol, Alhambra, CA (US); Robert A. Sykes, Richardson, TX (US); Adrian A. Abrantes, Murrieta, CA (US)

(73) Assignee: Raytheon Company, Waltham, MA (US)

( * ) Notice: Subject to any disclaimer, the term of this patent is extended or adjusted under 35 U.S.C. 154(b) by 203 days.

(21) Appl. No.: 13/016,119

(22) Filed: Jan. 28, 2011

(65) Prior Publication Data

US 2012/0197880 A1   Aug. 2, 2012

(51) Int. Cl.
*G06F 7/00* (2006.01)
*G06F 17/30* (2006.01)
(52) U.S. Cl.
USPC .......................................... 707/756; 707/803

(58) Field of Classification Search
None
See application file for complete search history.

(56) References Cited

U.S. PATENT DOCUMENTS

| 2010/0145979 | A1* | 6/2010 | Barnett .......................... 707/769 |
| 2011/0153683 | A1* | 6/2011 | Hoskinson ..................... 707/805 |
| 2011/0267369 | A1* | 11/2011 | Olsen ............................. 345/634 |

* cited by examiner

*Primary Examiner* — Uyen Le
(74) *Attorney, Agent, or Firm* — Christie, Parker & Hale, LLP

(57) ABSTRACT

A method may include subscribing each of a plurality of users to receive native-format geospatial information from a data source. The method may also include receiving native-format geospatial information from the data source. The method may further include analyzing native-format geospatial information and previously-rendered geospatial data file fragments to determine whether to update one or more previously-rendered geospatial data file fragments. The method may additionally include translating native-format geospatial information into geospatial data file fragments in response to a determination to update one or more previously-rendered geospatial data file fragments, and storing such geospatial data file fragments.

18 Claims, 3 Drawing Sheets

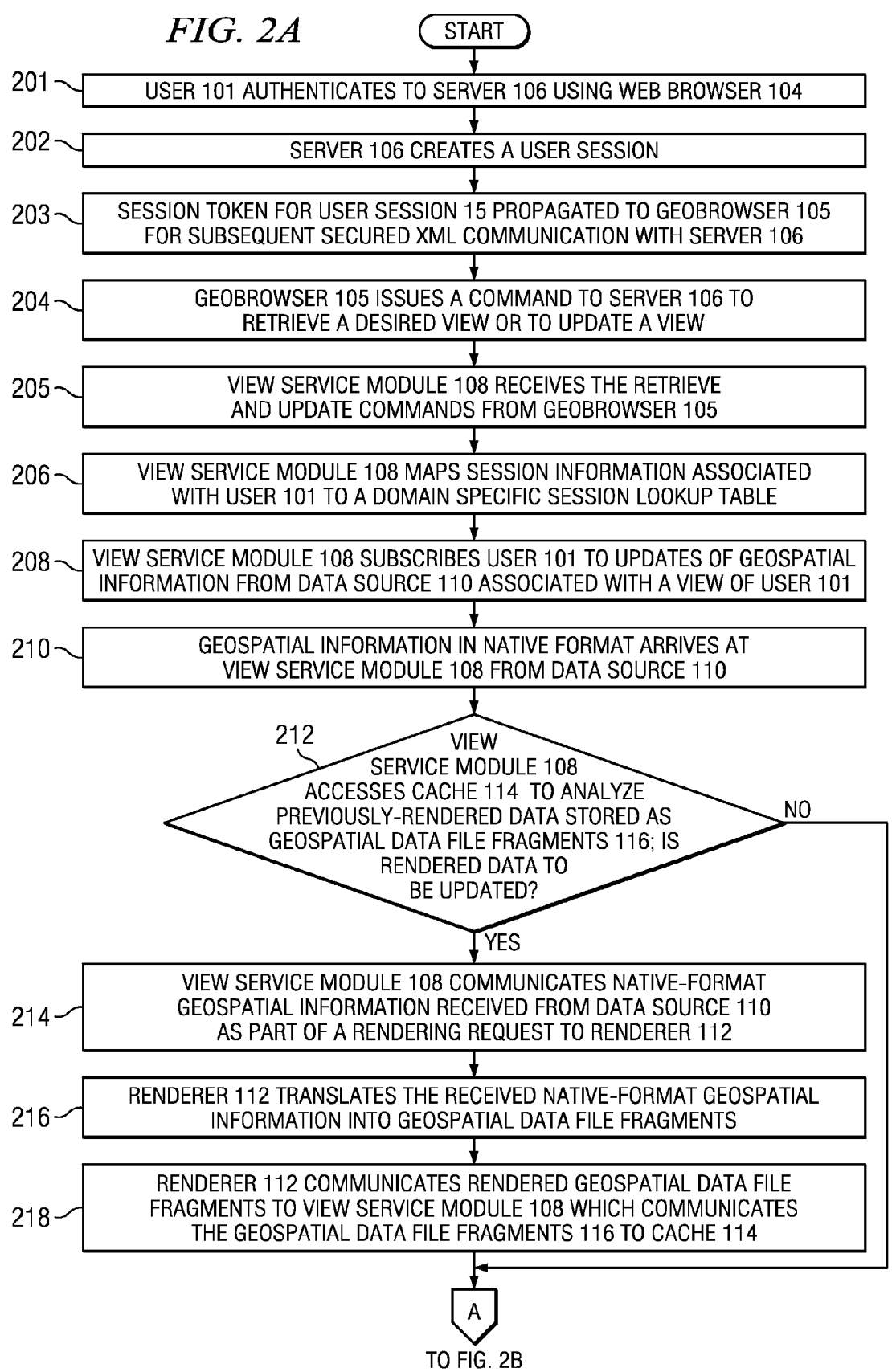

SYSTEM, METHOD, AND LOGIC FOR OPTIMIZED GEOSPATIAL DATA DELIVERY

GOVERNMENT RIGHTS

This invention was made with Government support via U.S. Government Contract No. F19628-03-D-0015. The Government may have certain rights in this invention.

TECHNICAL FIELD

The present disclosure relates generally to geospatial coordinate display systems, more particularly, to delivery of optimized geospatial data.

BACKGROUND

Geospatial information has recently seen increased use in commercial, industrial, scientific, military, and other applications. Generally speaking, geospatial information may mean data that describes geographic location and characteristics of natural or constructed features and boundaries on, above, or below the earth's surface. Geospatial information is commonly described in Keyhole Markup Language (KML). A KML file may include data specifying a set of features (place marks, images, polygons, three-dimensional models, textual descriptions, etc.), and configured to be read and displayed by a geobrowser. A geobrowser may include a software program configured to execute on a mobile or desktop computer or any other suitable electronic device that may read geospatial information (e.g., a KML file) and translate the geospatial information for two-dimensional or three-dimensional display on a monitor or other visual display device. An example of a commonly-used geobrowser is GOOGLE EARTH, developed by GOOGLE, INC.

A geobrowser may support dynamic display of geospatial information, wherein changes to geospatial information associated with a user's perception (e.g., present view in the geobrowser) may be dynamically loaded and displayed to a user. However, using conventional approaches, dynamic content generation may be undesirable due to high processing requirements, particularly for complex data sets and/or for a large number of users. Because KML does not support standard session parameters, KML-based geobrowsers track individual user sessions, thus adding to the computation requirements.

SUMMARY

In accordance with some embodiments of the present disclosure, a method may include subscribing each of a plurality of users to receive native-format geospatial information from a data source. The method may also include receiving native-format geospatial information from the data source. The method may further include analyzing native-format geospatial information and previously-rendered geospatial data file fragments to determine whether to update one or more previously-rendered geospatial data file fragments. The method may additionally include translating native-format geospatial information into geospatial data file fragments in response to a determination to update one or more previously-rendered geospatial data file fragments, and storing such geospatial data file fragments.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF EXAMPLE EMBODIMENTS

Figure 1:
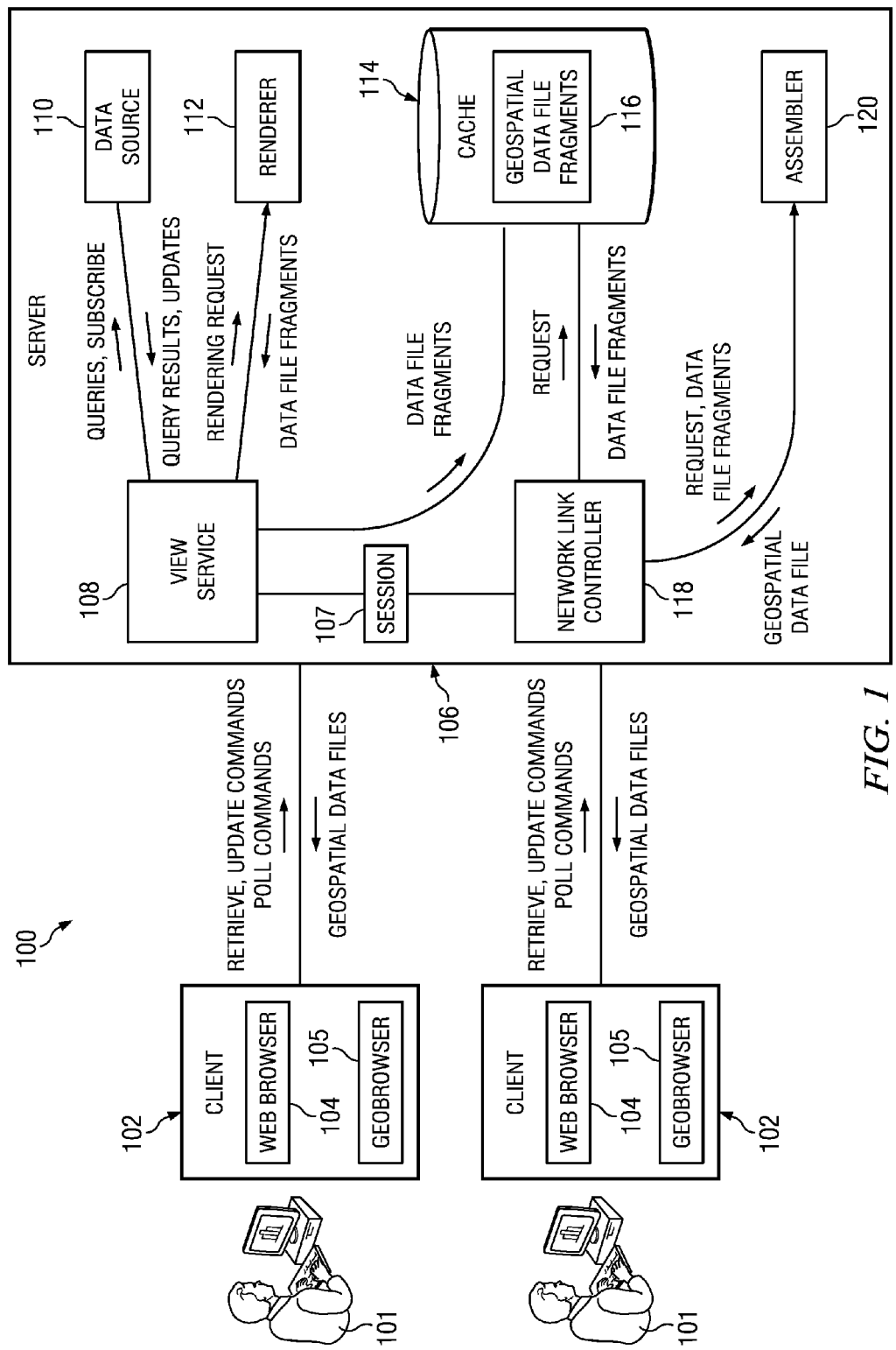
FIG. 1 illustrates a block diagram of an example geospatial information delivery system, in accordance with embodiments of the present disclosure.

FIG. 1 illustrates a block diagram of an example geospatial information delivery system 100, in accordance with embodiments of the present disclosure. As shown in FIG. 1, system 100 may include one or more clients 102 each interfacing with one or more users 101 and a server 106 communicatively coupled to the clients 102. Although this particular implementation of system 100 is illustrated and primarily described, the present disclosure contemplates system 100 being implemented in any suitable manner, according to particular needs.

A client 102 may include any system configured to receive geospatial data files (e.g., KML files) including geospatial information and, based on the received geospatial data files, display graphical representations (e.g., maps, place marks, images, polygons, three-dimensional models, textual descriptions, etc.) associated with the geospatial information to a user 101. In some embodiments, a client 102 may comprise a computing system, such as computing system 300 depicted in FIG. 3, for example.

The geospatial information received by client 102 may include variables that may be processed to render a "view" of a geographical location to a user 101, including without limitation longitude, latitude, tilt, heading, and altitude. The variables tilt, heading, and altitude may together define a "camera view" representing a user's perspective of the location defined by the longitude and latitude.

As depicted in FIG. 1, a client 102 may include a web browser 104. A web browser 104 may include any program of instructions executable on client 102 adapted for retrieving, presenting, and/or traversing information resources on the World Wide Web and displaying graphical and/or alphanumeric representations of information retrieved. For example, web browser 104 may comprise INTERNET EXPLORER, FIREFOX, SAFARI, CHROME, or any other suitable program.

A client 102 may also include a geobrowser 105. A geobrowser 105 may include any program of instructions executable on client 102 and configured to process received geospatial data files (e.g., KML files) and generate commands to a display device associated with client 102 to display graphical representations associated with the geospatial data files. In some embodiments, geobrowser 105 may be configured to execute GOOGLE EARTH, a similar geobrowser, or components thereof.

Server 106 may include any system communicatively coupled to clients 102 and configured to render, assemble, and communicate geospatial data files to clients 102 for dynamic display, as set forth in greater detail below. Server 106 may be communicatively coupled to clients 102 via any suitable combination of wireless or wireline networks, including without limitation the Internet or an intranet. In some embodiments, server 106 may comprise a computing system, such as computing system 300 depicted in FIG. 3, for example.

As shown in FIG. 1, server 106 may include a session 107, a view service module 108, one or more data sources 110, a renderer module 112, a cache 114, a network link controller module 118, and an assembler module 120.

Session 107 may include any system, device, or apparatus configured to interface with view service module 108 and network link controller module 118. Session 107 may manage user session state on server 106 and facilitate coordination between view service module 108 and network link controller module 118. In some embodiments, session 107 may be implemented as a program of instructions executable on server 106 (e.g., executable on a processor integral to server 106).

In general, view service module 108 may include any system, device, or apparatus configured to interact with geobrowser 105 to interpret server-side client-state or session information. For example, based on client-state or session information, view service module 108 may retrieve information from data source 110 and determine appropriate utilization of renderer 112 and assembler 120. As a further example view service module 108 may receive updates from data source 110 for data matching queries from geobrowser 105 (e.g., create, update, delete queries). Depending on the queue and characteristics of the data, view service module 108 may initiate updating of the geospatial data file fragments 116 stored in cache 116. In some embodiments, view service module 108 may be implemented as a program of instructions executable on server 106 (e.g., executable on a processor integral to server 106).

Data source 110 may include a computer-readable medium configured to store a collection of geospatial information organized in native data format. For example, geospatial information stored in data source 110 may include. For example, native format data may include one or more eXtensible Markup Language (XML) strings (which may not be limited to a system schema definition), which may include links to binary data (e.g., images, audio files, video files, etc.). As shown in FIG. 1, data source 110 may be in communication with view service module 108. Although data source 110 is depicted as being internal to server 106 in FIG. 1, it is understood that data source 110 may be external to server 110 (e.g., communicatively coupled to server 106 via any suitable combination of wireless or wireline networks, including without limitation the Internet or an intranet). In addition, although only one data source 110 is shown in FIG. 1, any suitable number of data sources 110 may be employed in system 100.

Renderer 112 may be in communication with view service module 108 and may include any system, device, or apparatus configured to translate geospatial information organized in a native data format into one or more geospatial data file fragments in a language readable by a geobrowser 105 (e.g., KML). In some embodiments, renderer 112 may be configured to convert XML metadata information into KML data. In these and other embodiments, renderer 112 may store binary data as a link within KML or may include renderer 112 fragmenting large images into a lower resolution tessellated layer, creating thumbnails of video data, etc.). For example, renderer 112 may receive a history of queries (e.g., "action" characteristics such as create, update, and delete, for example). Based on this history, renderer 12 may create KML fragments and remove closure elements within the history, and store such fragments in cache 114 as geospatial data file fragments 116. In some embodiments, such fragments 116 may be stored in a compressed state. In some embodiments, renderer 112 may be implemented as a program of instructions executable on server 106 (e.g., executable on a processor integral to server 106).

Cache 114 may be in communication with view service module 108 and network link controller 118 and may include a computer-readable medium configured to store geospatial data file fragments 116 (e.g., those geospatial data file fragments generated by renderer 112). In some embodiments, cache 114 may be part of an in-memory cache of server 106.

Network link controller 118 may include any system, device, or apparatus configured to interact with a geobrowser 105 to interpret server-side client-state or session information. In some embodiments, network link controller 118 may be similar in functionality to view service module 108, except that view service module 108 may interact with multiple components of geobrowser 105, while network link controller 118 may interact only with a geobrowser executing as part of web browser 104. For example, network link controller 118 may retrieve a status of client 102/geobrowser 105, retrieve status of a data fragment 116 within cache 114, and, based on such statuses, utilizes assembler 120 to update data of the data file fragment 116 in order to update geobrowser 105 with an appropriate view for its state. In some embodiments, network link controller 118 may be implemented as a program of instructions executable on server 106 (e.g., executable on a processor integral to server 106).

Assembler 120 may be in communication with network link controller 118 and may include any system, device, or apparatus configured to receive geospatial data file fragments (e.g., KML file fragments) and generate, based on the geospatial data file fragments, complete geospatial data files (e.g., KML files) readable by a geobrowser 105 to generate a display of geospatial information to a user 101 at a client 102. For example, assembler 120 may determine state of client 102/geobrowser 105 and aggregates geospatial data file fragments 116. Assembler 120 may compare current state of a client 102/geobrowser 105 and aggregate all data requiring modification based on client 102/geobrowser 105 and aggregate all data requiring modification based on client 102/geobrowser 105 status. Accordingly, assembler 120 may provide network link controller 118 with a comprehensive update for bringing an individual client 102/geobrowser 105 to a known state.

Figure 2B:
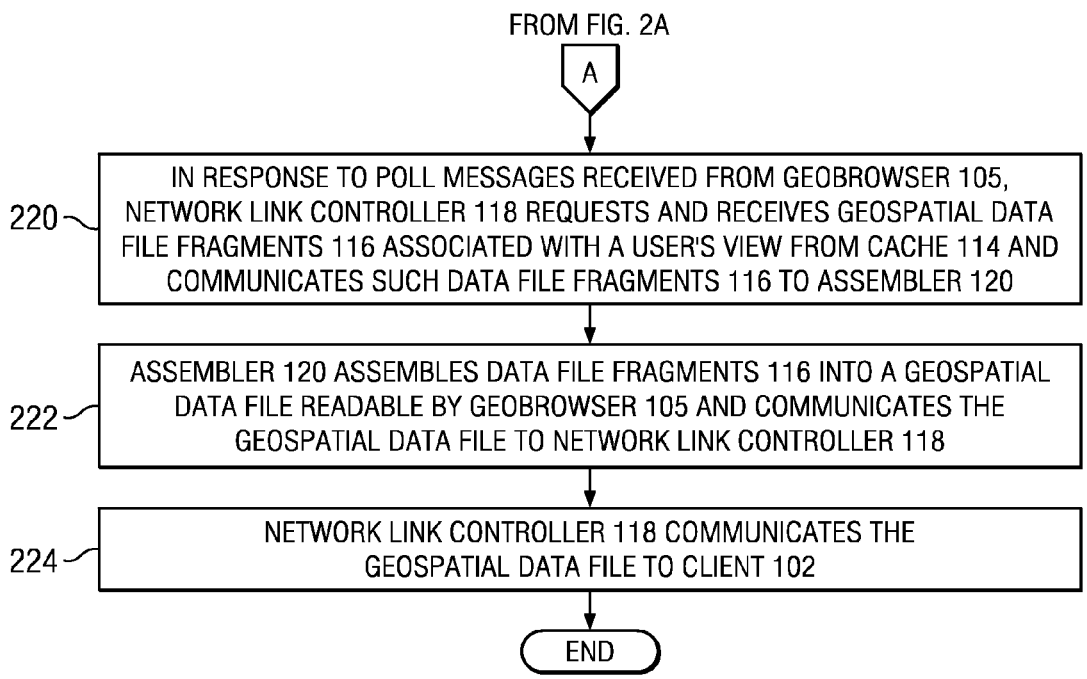
FIG. 2 illustrates a flow chart for an example method for delivery of geospatial information, in accordance with embodiments of the present disclosure.

Example operation of the various components of system 100 is described in FIG. 2.

FIG. 2 illustrates a flow chart for an example method 200 for delivery of geospatial information, in accordance with embodiments of the present disclosure. According to some embodiments, method 200 may begin at step 201. As noted above, teachings of the present disclosure may be implemented in a variety of configurations of system 100. As such, the preferred initialization point for method 200 and the order of the steps 201-224 comprising method 200 may depend on the implementation chosen.

At step 201, user 101 may authenticate to server 106 via web browser 104 to establish a secured. At step 202, in response, server 106 may create a secured communication session with user 101. At step 203, the session token for the user session may be propagated top geobrowser 105 for subsequent secured KML communication with server 106.

At step 204, geobrowser 105 may issue a command to server 106 to retrieve a desired view or to update a view. For example, a user 101 may indicate a desire to view a particular latitude and longitude at a particular camera view (e.g., tilt, altitude, and heading), which may cause geobrowser 105 to issue a command to server 106 to retrieve the view indicated by the various geospatial parameters. As another example, a user 101 may desire to modify his or her present view (e.g., by taking an action that changes the latitude, longitude, tile, altitude, and/or heading of the user's present view), which may cause geobrowser 105 to issue a command to server 106 to update the view. In some embodiments, these commands may be issued via Hypertext Transfer Protocol (HTTP) (e.g., via a web-based geobrowser).

At step 205, view service module 108 may receive the retrieve and update commands from geobrowser 105. At step 206, in response to receipt of the commands, view service module 108 may map session information associated with user 101 (e.g., login name and/or password) to a domain specific session lookup table (e.g., "domain-specific" meaning that users 101 may have different configurations, requirements, access privileges, etc.). This mapping may allow maintenance of relationships between the authentication of user 101 and rendered geospatial data file fragments.

At step 208, also in response to receipt of the commands, view service module 108 may subscribe user 101 to updates of geospatial information from data source 110 associated with a view of user 101 (e.g., by subscribing user 101 to a subscription-based message driven bean (MDB)) and/or query data source 110 for geospatial information.

At step 210, geospatial information in native format (e.g., Extensible Markup Language (XML)) may arrive at view service module 108 from data source 110 in accordance with the subscription established in earlier steps. At step 212, in response to arriving data (e.g., geospatial information in native format), view service module 108 may access cache 114 to analyze previously-rendered data stored as geospatial data file fragments 116. For example, view service module 108 may compare system-level modification time (e.g., the time that data source 110 reports as time of update or creation of data) and/or creation time of geospatial data file fragments 116 to determine whether previously-rendered data is usable or whether it should be updated. In certain embodiments, it may be appropriate to update the previously-rendered data if data received from data source 110 is newer or if data received does not have corresponding geospatial data file fragments stored in cache 114. If rendered data is to be updated based on analysis of the data received from data source 110, method 200 may proceed to step 214. Otherwise, method 200 may proceed to step 220.

At step 214, in response to a determination that rendered data is to be updated based on analysis of the data received from data source 110, view service module 108 may communicate native-format geospatial information received from data source 110 as part of a rendering request to renderer 112. To ensure all relevant content is generated, if appropriate, action-related entries (e.g., create, update, delete) associated with one or more items of information may be stored in cache 114.

At step 216, renderer 112 may translate the received native-format geospatial information into geospatial data file fragments. These data file fragments may be in a language readable by geobrowser 105 (e.g., KML file fragments).

At step 218, renderer 112 may communicate rendered geospatial data file fragments to view service module 108, which may in turn communicate the geospatial data file fragments 116 to cache 114. A portion or all of these geospatial data file fragments 116 may be stored in cache 114, thus ensuring that cache 114 is updated with the latest information. In some embodiments, geospatial data file fragments 116 may be stored in a compressed format (e.g., using a compression algorithm such as ZIP).

At step 220, in response to poll messages received from geobrowser 105, network link controller 118 may request and receive geospatial data file fragments 116 associated with a user's view (longitude, latitude, tile, altitude, heading, etc.) from cache 114 and communicate such data file fragments 116 to assembler 120.

At step 222, assembler 120 may assemble such data file fragments 116 into a geospatial data file readable by geobrowser 105 (e.g., a KML file) and communicate the geospatial data file to network link controller 118. At step 224 network link controller 118 may then communicate the geospatial data file to client 102, where geobrowser 105 may read the geospatial data file to render an image to user 101 on client 102. In some embodiments, server 106 may compress the geospatial data file prior to communicating the geospatial data file to client 102.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in a memory or other computer-readable media and executable by a processor or other suitable device.

In certain embodiments, by employing the system and method described above, as additional users request the same data, fewer updates and native format translations are required as the data may be presently available in cache 114.

Figure 3:
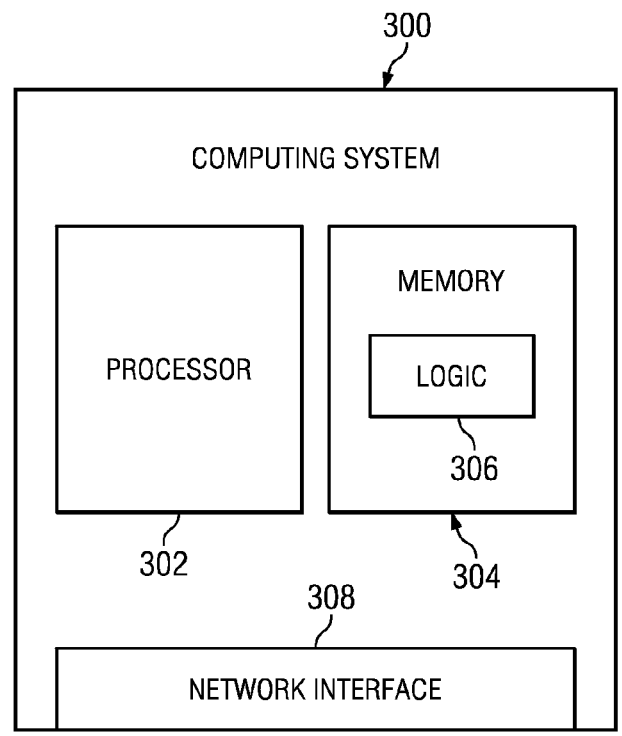
FIG. 3 illustrates a computer system, in accordance with embodiments of the present disclosure.

FIG. 3 is a block diagram illustrating aspects of an example computing system 300, in accordance with embodiments of the present disclosure. Client 102 and/or server 106 may be implemented in a computing system similar or identical to computing system 300. Computing system 300 may include processor 302, memory 304, logic 306, and network interface 308.

Computing system 300 may comprise any suitable combination of hardware and/or software implemented in one or more modules to provide or perform the functions and operations described above with respect to FIGS. 1 and 2. In some embodiments, computing system 300 may comprise a mainframe computer, general-purpose personal computer (PC), a Macintosh, a workstation, a Unix-based computer, a server computer, or any suitable processing device. In some embodiments, the functions and operations described above may be performed by a pool of multiple computing systems 300.

Memory 304 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 2 illustrates memory 304 as internal to computing system, it should be understood that memory 304 may be internal or external to computing system 300, depending on particular implementations. Memory 304 may be separate from or integral to other memory devices to achieve any suitable arrangement of memory devices for use in system 100.

Memory 304 may be further operable to store logic 306. Logic 306 generally comprises rules, algorithms, code, tables, and/or other suitable instructions for receiving, storing, generating, and/or transmitting relevant information.

Memory 304 may be communicatively coupled to processor 302. Processor 302 may be generally operable to execute logic to perform operations described herein. Processor 302 may comprises any suitable combination of hardware and software implemented in one or more modules to provide the described function or operation.

Network interface 308 may communicates information with one or more networks. A network may include communication using Internet protocol packets, frame relay frames, asynchronous transfer mode cells, and/or other suitable information between network addresses. A network may include one or more intranets, local area networks, metropolitan area networks, wide area networks, cellular networks, all or a portion of the Internet, and/or any other communication system or systems at one or more locations.

Modifications, additions, or omissions may be made to system 100 from the scope of the disclosure. The components of system 100 may be integrated or separated. In addition, the components of system 100 may implemented in hardware, firmware, and/or software. Moreover, the operations of system 100 may be performed by more, fewer, or other components. As used in this document, "each" refers to each member of a set or each member of a subset of a set.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, and other electromagnetic and/or optical carriers; and/or any combination of the foregoing.

For the purposes of this disclosure, logic may perform the operations of a component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

The systems and methods described above allow for mapping of a global content publish and subscribe system to an in-memory cache that may provide performance increases and load balances beyond that of conventional systems, as a system may, in certain instances, modify display of data without additional manipulation of content.

Although the present disclosure has been described with several embodiments, various changes and modifications may be suggested to one skilled in the art. It is intended that the present disclosure encompass such changes and modifications as fall within the scope of the appended claims.

What is claimed is:

1. A system comprising:
a view service module configured to:
subscribe each of a plurality of users to receive native-format geospatial information from a data source;
receive native-format geospatial information from the data source; and
analyze native-format geospatial information and previously-rendered geospatial data file fragments to determine whether to update one or more previously-rendered geospatial data file fragments;
a renderer in communication with the view service module and configured to translate native-format geospatial information into geospatial data file fragments in response to a determination to update one or more previously-rendered geospatial data file fragments; and
a cache in communication with the view service module and configured to store geospatial data file fragments.

2. A system according to claim 1, further comprising:
a network link controller configured to:
receive poll messages from a geobrowser;
retrieve geospatial data file fragments from the cache in response to receiving the poll messages;
an assembler in communication with the network link controller and configured to:
receive the geospatial data file fragments from the network link controller; and
assemble the geospatial data file fragments into a geospatial data file readable by the geobrowser;
the network link controller further configured to communicate the geospatial data file to the geobrowser.

3. A system according to claim 2, wherein the geospatial data file is a Keyhole Markup Language (KML) file.

4. A system according to claim 1, wherein the geospatial data file fragments include Keyhole Markup Language (KML).

5. A system according to claim 1, wherein storing geospatial data file fragments comprises storing geospatial data file fragments in a compressed format.

6. A system according to claim 1, wherein receiving native-format geospatial information from the data source comprises receiving native-format geospatial information via a subscription-driven message driven-bean (MDB).

7. A computer-implemented method, comprising:
subscribing, using one or more processors, each of a plurality of users to receive native-format geospatial information from a data source;
receiving, using the one or more processors, native-format geospatial information from the data source;
analyzing, using the one or more processors, native-format geospatial information and previously-rendered geospatial data file fragments to determine whether to update one or more previously-rendered geospatial data file fragments; and
in response to a determination to update one or more previously-rendered geospatial data file fragments:
translating, using the one or more processors, native-format geospatial information into geospatial data file fragments; and
storing, using the one or more processors, geospatial data file fragments.

8. A method according to claim 7, further comprising: in response to poll messages received from a geobrowser, assembling geospatial data file fragments into a geospatial data file readable by the geobrowser; and communicating the geospatial data file to the geobrowser.

9. A method according to claim 8, wherein the geospatial data file is a Keyhole Markup Language (KML) file.

10. A method according to claim 7, wherein the geospatial data file fragments include Keyhole Markup Language (KML).

11. A method according to claim 7, wherein storing geospatial data file fragments comprises storing geospatial data file fragments in a compressed format.

12. A method according to claim 7, wherein receiving native-format geospatial information from the data source comprises receiving native-format geospatial information via a subscription-driven message driven-bean (MDB).

13. A non-transitory computer-readable storage medium comprising logic, the logic when executed by one or more processors operable to perform operations comprising:
  subscribing each of a plurality of users to receive native-format geospatial information from a data source;
  receiving native-format geospatial information from the data source;
  analyzing native-format geospatial information and previously-rendered geospatial data file fragments to determine whether to update one or more previously-rendered geospatial data file fragments;
  translating native-format geospatial information into geospatial data file fragments in response to a determination to update one or more previously-rendered geospatial data file fragments; and
  storing geospatial data file fragments.

14. The non-transitory computer-readable medium according to claim 13, wherein the operations further comprise:
  assembling geospatial data file fragments into a geospatial data file readable by the geobrowser in response to poll messages received from a geobrowser; and
  communicating the geospatial data file to the geobrowser.

15. The non-transitory computer-readable medium according to claim 14, wherein the geospatial data file is a Keyhole Markup Language (KML) file.

16. The non-transitory computer-readable medium according to claim 13, wherein the geospatial data file fragments include Keyhole Markup Language (KML).

17. The non-transitory computer-readable medium according to claim 13, wherein storing geospatial data file fragments comprises storing the geospatial data file fragments in a compressed format.

18. The non-transitory computer-readable medium according to claim 13, wherein receiving native-format geospatial information from the data source comprises receiving native-format geospatial information via a subscription-driven message driven-bean (MDB).

* * * * *